FIG. 1

Oct. 4, 1938.  I. E. McCABE  2,131,783
CONTROL FOR ELECTRICALLY OPERATED STOKER MECHANISM FOR COAL FURNACES
Filed Jan. 14, 1933  4 Sheets-Sheet 2

INVENTOR
IRA E. McCABE
BY Langdon Moore
ATTORNEY

Oct. 4, 1938.   I. E. McCABE   2,131,783
CONTROL FOR ELECTRICALLY OPERATED STOKER MECHANISM FOR COAL FURNACES
Filed Jan. 14, 1933   4 Sheets-Sheet 3

INVENTOR
IRA E. McCABE
BY Langdon Moon
ATTORNEY

Oct. 4, 1938.  I. E. McCABE  2,131,783
CONTROL FOR ELECTRICALLY OPERATED STOKER MECHANISM FOR COAL FURNACES
Filed Jan. 14, 1933  4 Sheets-Sheet 4

INVENTOR
IRA E. McCABE
BY
ATTORNEY

Patented Oct. 4, 1938

2,131,783

UNITED STATES PATENT OFFICE 2,131,783

CONTROL FOR ELECTRICALLY OPERATED STOKER MECHANISM FOR COAL FURNACES

Ira E. McCabe, Chicago, Ill.

Application January 14, 1933, Serial No. 651,750

29 Claims. (Cl. 236—46)

This invention relates to improvements in controls for electrically operated stoker mechanism for feeding coal to furnaces and more particularly to providing means in connection with the control mechanism for maintaining the continuous burning of coal where automatically controlled heat is desired as in the heating of dwellings or buildings.

It is recognized that there are several automatic devices now on the market for automatically feeding coal to furnaces or boilers for producing hot air or vapor for heating systems as well as producing steam for heating or other purposes. These devices comprise a system for automatic control of the heating plant and include a room thermostat in the room where the heat is desired to be maintained uniform, and operating at a predetermined set temperature to operate the stoker mechanism to build up the fire and to stop the operation of the equipment when the temperature has been raised the desired amount. The system may also include a boiler control which will prevent operation of the stoker when the temperature or pressure within the steam boiler reaches the danger mark and allows for continued operation as long as the temperature or pressure remains below that point. It is also recognized that in stokers of the above described type control apparatus has been commercially employed when the temperature of the room causes the room thermostat to break the circuit to the stoker operating means, which includes a separate thermostatic control actuated by a predetermined minimum temperature in the combustion space, for preventing extinguishment of the fire, causing the stoker apparatus to feed coal until a predetermined maximum temperature, considerably less than sufficient to increase the temperature of the building, is reached, whereupon the stoker ceases operation until the said minimum temperature of the combustion space is again reached and by this intermittent operation, prevents the coal fire from becoming extinguished, while certain other controls for automatic stokers of this type include a clock which will periodically actuate the stoker mechanism when the room thermostat has opened the motor circuit for short periods of time at each clock actuated operation to prevent the extinguishment of the coal fire while the room thermostat remains open.

This invention contemplates the provision of means for controlling the operation of a stoker motor, when such is the operating means, the operation of which may be controlled by a room thermostat or boiler control in the manner above described and providing means, without depending upon a minimum temperature occurring in the combustion space nor depending upon the operation of a clock, for controlling periodic operations of the motor to prevent the extinguishment of the coal fire when heat demands are nil, and at the same time in the event the coal fire should become extinguished to break the stoker motor circuit and cause the control mechanism to become inoperative until the same is reset by hand, regardless of the demand for heat by the boiler control or thermostat.

In the commercial methods referred to on account of the various sizes of combustion chambers and the character of coal employed, considerable difficulty has been experienced in determining the period of time necessary for the operation of the stoker in the clock controlled device to maintain a bed of coals while the room thermostat is open in order that as soon as the room thermostat calls for heat, the coals will immediately ignite the fuel supplied by the continuous operation of the stoker mechanism and likewise considerable difficulty has been experienced in those devices employing a separate or additional thermostatic control actuated by predetermined minimum temperature of the combustion space for preventing extinguishment of the fire in selecting the predetermined temperature for this purpose when the room thermostat is open.

It is also recognized that in addition to the above described commercial automatic controls bi-metallic devices such as that disclosed in the applicant's prior Patent No. 1,834,288, dated December 1, 1931, have also been commercially employed in the stack leading from the furnace to the chimney to cause the burner motor to operate when the temperature of the combustion space falls to a predetermined low temperature and it has been found in practice that such devices have proven unsatisfactory due to the changes caused by excessive temperature and the chemical action of the flue gases upon the bi-metallic element which impairs the accuracy of operation necessary for this bi-metallic device to successfully maintain its point of operation. In this type, it is also difficult to select the proper operating point of flue temperature to cause the stoker to feed just enough coal to keep the fire alive when the room thermostat is open.

Furthermore, when such stack devices are employed, they at times are actuated to provide very frequent operation of the stoker equipment. It has been found that these devices will operate at intervals as short as three minutes even though the necessary drop to the predetermined set low point be 150 degrees or more. Such frequent operation as this produces additional wear to the stoker mechanism and increases the cost of maintenance of such types of coal feeding equipment.

This invention contemplates a mechanism to overcome the above specified difficulties which will be operated through a room thermostat and boiler control when heat is required of the heating system and when the desired temperature is produced by the heating system will maintain a minimum feeding of coal to prevent the extinguishment of the fire and in addition thereto should the fire become extinguished to render the control mechanism inoperative and prevent the operation of the stoker motor until the apparatus is reset by hand.

This invention contemplates the application of a commercial stack safety or thermally operated device placed in the stack of the furnace constructed to break a circuit upon a rise in temperature of the flue gases and to close the said circuit upon a fall in temperature of said gases said circuit connected in series with a motor for operating a delay switch and after a predetermined operation of said motor to close the circuit to the stoker motor and thereafter break the circuit to the first motor and also the stoker motor. A room thermostat is placed in multiple in the circuit with the delay switch, so that when the room thermostat calls for heat, the stoker motor is energized and will feed coal into the combustion space and if there is fire in this combustion space, the temperature thereof will be greatly increased, causing the stack safety to break the circuit to the motor for operating the delay switch for controlling the stoker motor and as the stack safety remains in open position as long as the thermostat calls for heat, and heat is produced, it is not otherwise affected by the stack temperature.

This invention further contemplates that, upon the opening of the room thermostat breaking the circuit to the stoker motor so that the supply of fuel will cease and the temperature of the gases through the stack will become lower, the stack safety immediately closes the circuit to energize the motor for operating the delay switch and thereafter this motor operated switch will cause the stoker motor to supply enough fuel to maintain a low fire.

This invention further contemplates should either the room thermostat or the stack safety, in its normal operation when the room thermostat is open, energize the stoker motor to feed fuel when the fire has become extinguished, a safety control switch in the stoker motor circuit will be released from its normal closed position to open and will be locked in the open position preventing the operation of the stoker motor until the stoker motor safety control switch is manually reset.

The particular difference between the bimetallic stack device cited as being in use today for the control of intermittent operation of the stoker equipment and the stack safety or combustion switch used with this invention lies in their reaction to the flue temperatures to open and close its circuit.

In the former, as before stated, the control is set to close its circuit at a predetermined low temperature which results in the device operating on a hundred degree drop in temperature one time, a five hundred degree drop another and at other times upon other widely varied changes in stack temperature depending on the periods of stoker operation and the efforts required to heat the dwelling on days of varying weather conditions.

The intermittent firing mechanism disclosed contemplates the use of a stack safety having an adjustable differential which may be substantially constant when set so that should the operating point be set to close upon a seventy degree drop in temperature the control would close its circuit upon that drop in temperature whether the temperature from which the drop is initiated be two hundred degrees or six hundred degrees and the closing of this switch sets in motion the mechanism for operating the stoker during "off" periods of the room thermostat. Since these flue gases are dissipated quite rapidly the stack device herein employed actuates very rapidly so that upon the opening of the room thermostat the stoker mechanism is stopped and immediately thereafter the stack switch operates to operate the intermittent mechanism and means are thus provided to establish and maintain the desired periods for starting and operating the stoker mechanism during the "low fire" periods.

While this particular control has been briefly described above in connection with the operation of a coal stoker for heating purposes and an embodiment of this invention for this purpose is illustrated upon the accompanying sheets of drawings, yet it is to be noted that this invention is not limited to this particular embodiment as it may be used for controlling the operation of an electric motor for actuating devices other than coal stokers.

Figure 1:
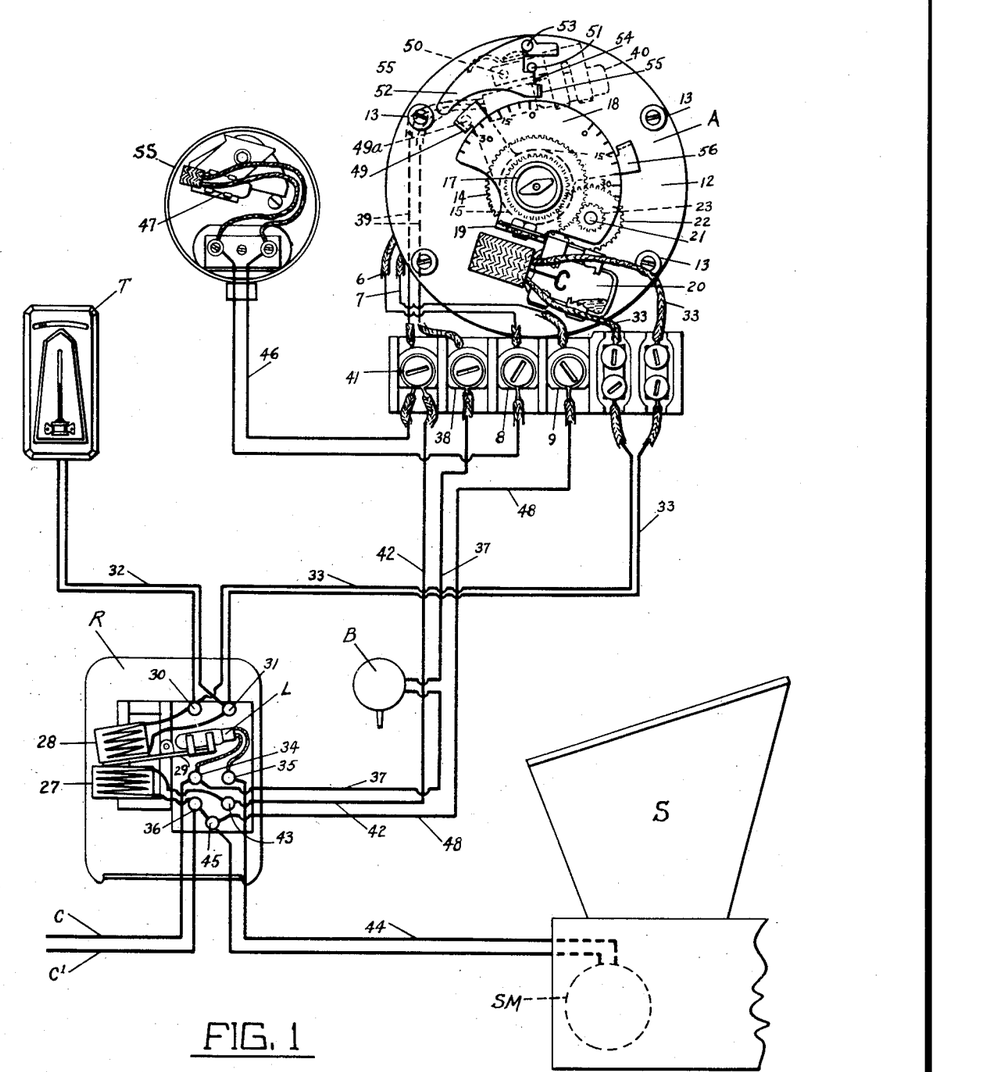
Figure 1 is a diagrammatical view illustrating the elements of the control as applied to a coal-stoker for furnaces and includes a wiring diagram of the same.

Referring to Figure 1, a commercial stoker S is illustrated diagrammatically which is operated by the motor SM. A commercial relay R, preferably of the repulsion type, as disclosed in this applicant's prior pending application, Serial No. 500,747, filed December 8, 1930, is connected to the commercial line and to the stoker motor. A commercial room thermostat T is connected in circuit with the secondary windings of the relay R. A commercial stack safety SS, which may be of the type disclosed in this applicant's prior patent, No. 1,762,183, dated June 10, 1930, in which the position of the mercury tube is reversed, or that disclosed in applicant's prior Patent No. 1,691,016, dated November 6, 1928, in which case the contacts of the switch would be positioned to normally be immersed in the mercury, so that when the stack is cold, the circuit through the stack safety will be closed and which will be opened upon the rise in temperature, is connected to binding posts, in a casing not shown, which supports the motor operating mechanism A for actuating the delay switch for keeping the fire alive in the stoker when the desired temperature has been reached in the room containing the room thermostat and the thermostat has ceased to call for heat.

Figure 2:
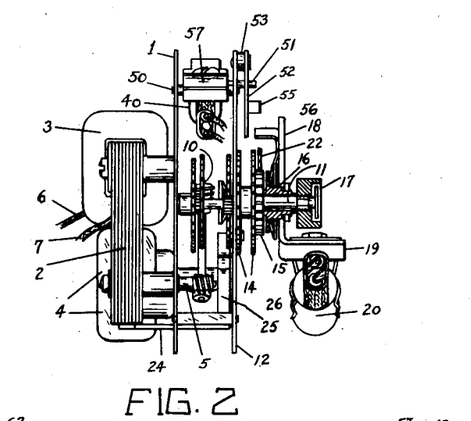
Figure 2 is a view in end elevation of the motor operated mechanism for actuating the delay switch with the casing removed.
Figures 3, 4, 5:
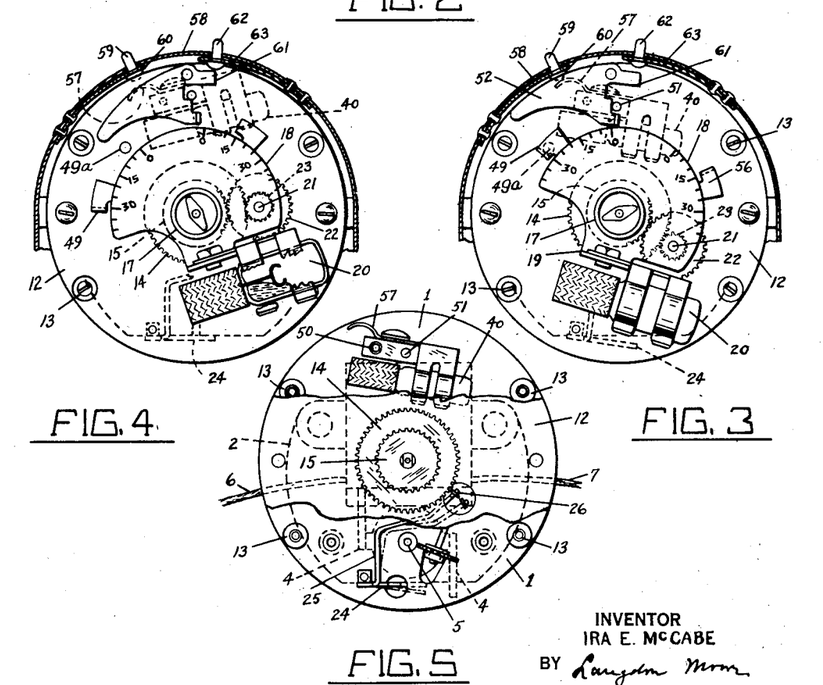
Figure 3 is a view in front elevation of Figure 2, illustrating the motor delay switch in its normal open position when the stack safety switch has been opened by the normal operation of the stoker in producing heat when the room thermostat calls for heat, with the casing broken away and partly in section.
Figure 4 is a view similar to Figure 3, illustrating the motor delay switch in its normal closed position after the stack safety has been closed by a reduction in temperature of the flue gases when the temperature in the room has actuated the room thermostat to open the stoker motor circuit.
Figure 5 is a view similar to Figure 3, in which the delay switch carrying plate has been removed, illustrating the mechanism covering plate broken away at the top and bottom to illustrate the stoker motor safety switch, which switch is illustrated in its normal closed position in dotted lines in Figure 3, and the armature operating arm.

In the embodiment illustrated in Figures 1 to 5, inclusive, the motor operated mechanism A for actuating the delay switch includes a back plate 1 which, as shown in Figure 2, supports upon the rear side thereof a self-starting synchronous electric motor including the motor field 2, windings 3, shading coils 4 and rotor shaft 5 with the winding 3 connected by leads 6 and 7 to binding posts 8 and 9, respectively. The rotor shaft 5 passes through the back plate 1 and is adapted, upon rotation, to impart movement through a train of gears 10 to the shaft 11 which shaft 11 passes through a front plate 12 held in spaced relation from the back plate by a plurality of posts 13. About the shaft 11 on the exterior of the plate 12, two gears 14 are carried upon a sleeve which is mounted to rotate freely about the shaft 11. Resting upon the outer gear 14 is a smaller gear 15 which is keyed upon the shaft 11 to rotate therewith. Resting against this gear 15 a freely rotatable sleeve 16 is mounted upon the shaft 11 and held from displacement thereon by a screw-cap 17. The rotatable sleeve 16 mounts a delay switch carrying plate 18 of arcuate form to rotate with said sleeve and having a portion 19 bent outward at right angles thereto to support a mercury tube delay switch 20 so arranged that the weight of the switch 20 will normally rotate the sleeve 16 and carrying plate 18 to cause the delay switch 20 to assume the open position, as shown in Figures 1 and 3.

The underside of the delay switch carrying plate 18 carries a pivot pin 21 upon which a gear 22 and pinion 23, secured to said gear, are mounted to rotate with the pinion 23 meshing with the loosely mounted gear 14 and the gear 22 meshing with the gear 15 keyed upon the shaft 11, so that if the freely rotatable gear 14 is held against rotation and the shaft 11 is rotated with the parts in the position shown in Figure 3, motion will be transmitted through the gear 22 and pinion 23 to the delay switch carrying plate 18, causing the same to rotate about the shaft 11 to assume the position shown in Figure 4. To accomplish this a metallic lock operating arm 24 is pivoted to the base plate 1 which arm extends under the field 2 of the synchronous motor in such relation that when the motor is energized, the arm 24 will act as an armature and be caused to rotate about its pivotal point. This operating arm 24 is provided with an extension 25 on the other side of the base plate 1, the extremity of which is provided with a latch 26 which is adapted to engage the teeth of the loosely mounted gear 14 and lock the same against movement upon the shaft 11, as shown in Figure 5. When the synchronous motor is de-energized and the field of the magnet having become dead, the shape and weight of the extension 25 will cause the latch 26 to drop out of engagement with the gear 14, as shown in dotted lines in Figure 5, and the delay switch 20 will return to its open position.

The embodiment of the relay R, as illustrated, includes a stationary primary coil 27 and a movable or floating secondary coil 28. The movement of the coil 28 by means of the pivoted arm 29, supporting at its other end the mercury tube switch L, imparts an opening or closing action to said switch. The windings of the secondary coil are connected to the binding posts 30 and 31, respectively, and these binding posts are connected by leads 32 to the room thermostat T and the same binding posts are connected by leads 33 to the terminals of the motor delay switch 20. The terminals of the mercury tube switch L are connected to binding posts 34 and 35, respectively, and the leads from the commercial line current C and C' are connected to the binding posts 34 and 36, respectively. The binding post 34 is connected by the lead 37, preferably through a boiler control B of commercial construction to the binding post 38. The binding post 38 is connected by the lead 39 through the hand reset safety switch 40, preferably of the commercial mercury type, to the binding post 41 which binding post is connected by lead 42 to binding post 43 of the relay R. The terminals of the windings of the primary coil 27 of the relay R are connected to binding posts 36 and 43, respectively. The binding post 35 is connected by lead 44 through the stoker motor M to the binding post 45 of the relay R. The binding post 41 is also connected by the lead 46 through the mercury tube switch 47 of the stack control SS to the binding post 8 which binding post is connected through leads 6 and 7 through the synchronous motor to binding post 9. The binding post 9 is connected by the lead 48 to binding post 45 of the relay R which in turn is connected through binding post 36 of the relay to the commercial line C'.

Before the heating system can be automatically controlled, it is necessary that a fire be started in the combustion space of the furnace. This fire would naturally be started when the room thermostat T called for heat, which would close the circuit by the lead 32 to the secondary winding 28 of the relay R. In the normal cold position, the stack safety switch 47 is closed so that the primary current would pass through line C, binding post 34, lead 37 through the boiler control B to binding post 38 and thence through lead 39 and the normally closed hand reset switch 40 to binding post 41 and thence through lead 42, binding post 43 through the primary coil 27 to the binding post 36 and back to the commercial line C'. Upon the closing of the room thermostat, the relay will be energized causing the coil 28 to be repelled and thereby close the line switch L, whereupon the incoming current will pass from binding post 34 through the closed switch L to binding post 35 and thence by the way of lead 44 through the stoker motor SM and back through binding posts 45 and 36 to commercial line C'. This will energize the stoker mechanism and cause fuel to be fed into the combustion space until the room thermostat opens the circuit through the secondary coil 28. At the initial starting with the combustion space cold, the stack safety switch 47 will be closed and would close the circuit from binding post 41 to binding post 8 and through the synchronous motor, binding post 9 and lead 48 through binding posts 45 and 36 through the commercial line C' and thereby start the motor operated mechanism A for actuating the delay switch 20, but as soon as the temperature in the combustion space increases, the stack safety will be actuated and the stack safety switch 47 will be opened and will remain open as long as the room thermostat is closed. When the desired temperature is obtained in the room to be heated, the room thermostat opens the circuit through the secondary coil, thereby deenergizing the relay and opens the commercial circuit through the line switch L to the stoker motor and the stoker ceases operation. As soon as the temperature decreases in the combustion space, the flue gases acting upon the stack safety will also decrease in temperature, whereupon the stack safety will close the stack safety switch 47, so that the circuit is completed from binding post 41 through closed switch 47 to binding post 8 and through leads 6 and 7 energize the synchronous motor, whereupon the operating arm 24 will cause its latch 26 to lock the gear 14 and cause the delay switch carrying plate 18 to rotate about the shaft 11 and close the circuit from binding post 30 through leads 33 and closed delay switch 20 to binding post 31, thereby energizing the relay and causing the line switch L to close the circuit from the commercial line therethrough to the stoker motor and cause fuel to be fed to the combustion space after the delay caused by the time consumed for the synchronous motor to close the delay switch 20, so that as soon as the fire has been replenished, the temperature of the flue gases will cause the stack safety to operate to break the circuit through the switch 47 and synchronous motor, whereupon the latch 26 will free the gear 14 and allow the carrier plate 18 to rotate until the delay switch 20 has opened and this operation will be repeated as soon as the temperature of the flue gases drops to cause the stack safety to close the switch 47 and the cycle will be repeated as long as the room thermostat remains open. The operation of the synchronous motor through the train of gears to the shaft 11 is very slow and the interval between the automatic operations for closing the circuit through the delay switch is determined by the amount of rotation necessary to the carrier plate 18 to close the delay switch 20. This time may be determined by the cooperation of a stop 49ª upon the front plate 12 and an indicator arm 49 adjustably mounted upon the sleeve 16 and in frictional engagement with the carrier plate 18. The exterior of the carrier plate 18 may be calibrated into divisions of minutes as illustrated and by setting the forward end of the indicator 49 for any desired number of minutes, when the synchronous motor is deenergized the arm 49 will engage the stop 49ª and hold the delay switch 20 in such a position that the rotation of the shaft 11, when the synchronous motor is again energized, will consume the indicated number of minutes to close the delay switch 20.

The hand reset switch 40 in the line circuit through the primary windings of the coil 27 is a safety switch and is mounted to swing upon pivot 50 between the front and back plates 11 and 12, respectively, and if unrestrained would swing to the open position. The pivoted mounting of the switch 40 is provided with an extension 51 passing through the front plate and is adapted to be engaged by a weighted pivoted latch 52 to hold the switch 40 in closed position. This latch 52 is mounted upon a stud 53 upon the exterior of the front plate 12 with the majority of its weight upon one side of the pivot and directly under the pivot provided with a shoulder 54 adapted to engage under the stud 51 when the switch 40 is manually rotated to closed position and the weighted portion of the latch will hold the switch normally in this position. The latch 52 below the shoulder is provided with a stop 55 which is adapted to cooperate with an adjustable arm 56 adjustably mounted upon the sleeve 16 and held in frictional engagement with the carrier plate 18 so that upon undue rotation of the carrier plate 18 the arm 56 will engage the stop 55 and rotate the latch to release the pin 51, allowing the switch to rotate to the open position, whereupon the operation of the stoker motor is stopped and cannot be started again until said switch is placed in its closed position. Thus if at any time the fire becomes extinguished, the stack switch 47 will be in closed position, so that the relay will be energized to close the line switch L to operate the stoker motor, and, as the circuit through the closed stack safety switch remains closed, the synchronous motor will be energized, causing the carrier plate 18 to rotate to close the delay switch 20 and as the stack safety switch 47 remains closed, the synchronous motor will continue the rotation of the carrier plate 18 until the arm 56 engages the stop 50 and releases the hand reset switch 40, whereupon all operation ceases. The carrier plate 18 may be calibrated any number of minutes as indicated and the adjustable arm 56 set so that after a predetermined number of minutes the switch 40 will be released.

It is contemplated to provide a manual means for releasing the safety switch 40 when it is desired to shut down the operation and prevent continuance of the operation of the stoker mechanism, as well as to provide means for manually resetting this switch to allow the normal operation of the control. Figures 3 and 4 illustrate one means of accomplishing this result.

As shown in these figures, the mounting for the safety switch 40 is provided with a member 57 extending to the rear of the pivot which when the switch has been released to assume the open position, will contact with a reset pin 59 on the interior of the casing 58 containing the motor operated mechanism A. The hand reset pin 59 is mounted upon one end of a flat spring 60 secured at the other end to the casing 58 which pin extends through said casing and upon depression is adapted to engage the extension 57 to rotate the switch until the pin 51 is engaged by the shoulder of the latch 52. This latch 52 is provided with a nose 61 extending on the other side of its pivot 53 and a manual release pin 62 mounted upon a flat spring 63 and extending through the casing 58, in the same manner as the manual reset pin 59, is provided which upon depression will rotate the latch 52 about its pivot to release the safety switch to fall into the open position.

Figures 6, 7:
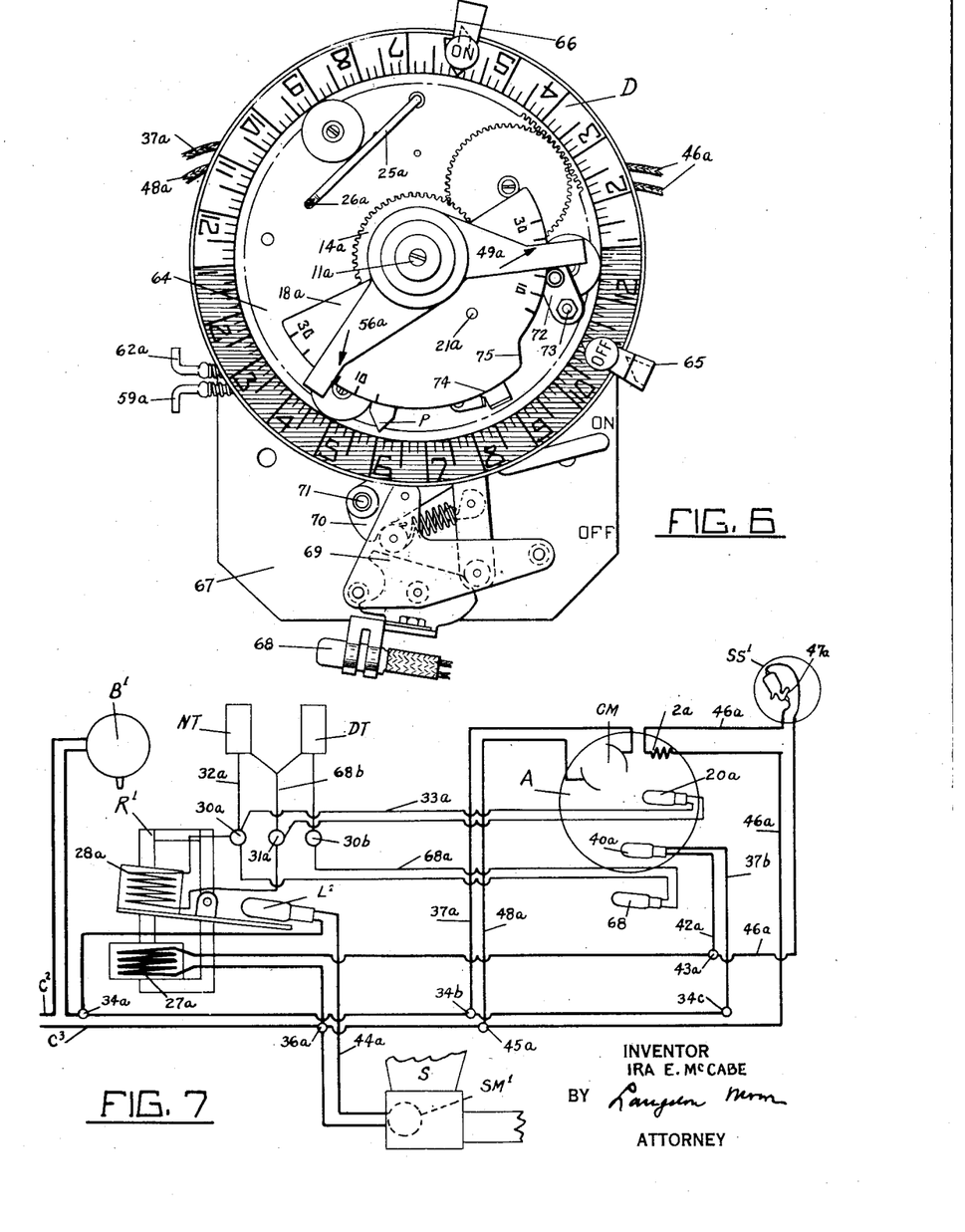
Figure 6 is a view in front elevation of a modified form of motor operated mechanism for operating the delay switch, with the casing removed.
Figure 7 is a diagrammatical view illustrating this modification and other elements of the control including a wiring diagram of the same.
Figures 8, 9, 10:
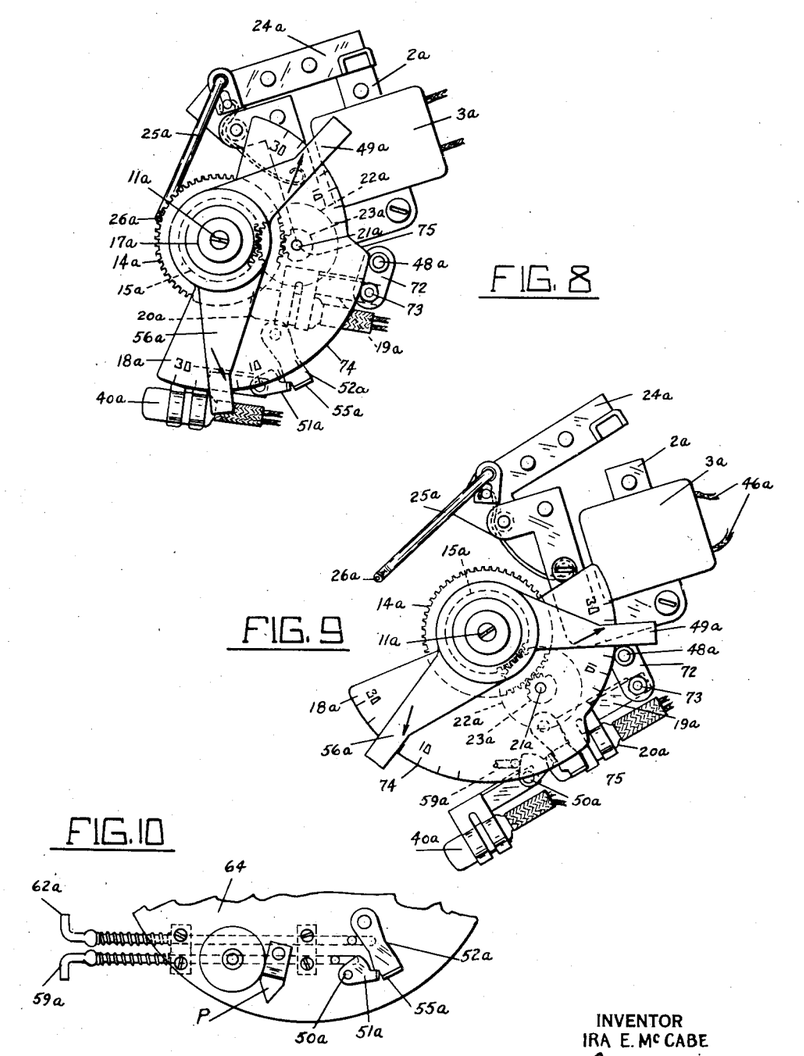
Figure 8 is a detail view in elevation of the form illustrated in Figure 6 with the program dial, casing, and front and back plates of the mechanism removed, illustrating the position of the parts assumed when the mechanism is operating to maintain a low fire in the stoker.
Figure 9 is a similar view illustrating the position of the parts assumed after the safety switch has been opened.
Figure 10 is a detail fragmentary view illustrating the manual release and manual reset for the safety switch.

Figure 6 illustrates a modification of this invention as applied to a commercial program electric clock for controlling an electric circuit. Clocks of this type include a clock motor CM for the continuous operation of the usual clock mechanism and in addition thereto a rotating annular dial D calibrated for twenty-four hours which is caused to rotate by the clock mechanism. In the modification shown, the time pointer P is fixed to the front plate 64 of the clock mechanism as shown in Figures 6 and 10. One half of the dial is shaded and the divisions are marked with numerals from 1 to 12, the other part of the dial is white and the divisions are similarly marked, representing the hours of day and night and each hour space is divided to represent ten minute intervals, so that as the dial D rotates, the pointer P will indicate the time of day or night. Adjustable stops 65 and 66 are mounted to embrace the periphery of the dial. On the base, 67 supporting the clock mechanism and below the same is mounted a mercury tube 68 upon a snap action mechanism 69 constructed in accordance with this applicant's prior patent, No. 1,734,016 of October 29, 1929, in which the actuating member 70 thereof is provided with a lug 71 adapted to be engaged consecutively by the stops 65 and 66, whereby stop 65 throws the switch to the open position and stop 66 throws the switch to closed position.

The above is a general description of the commercial program clock where an electric circuit may be opened or closed at any predetermined time during a cycle of twenty-four hours by the proper setting of the adjustable stops 65 and 66. This invention contemplates the application of such a program clock to control the circuit to an electrically operated coal stoker mechanism, whereby two room thermostats may be employed to control the normal operation of the coal stoker, the day thermostat being automatically operative during the day time for controlling the stoker, where normally more heat is required, and the night thermostat employed to control the night running of the stoker, when less heat is normally required.

In carrying out this modification of this invention, the gear wheel 14a, in Figures 6, 8 and 9, is loosely mounted upon the shaft 11a and the gear wheel 15a is keyed upon this shaft, so that these parts correspond to the parts 11, 14 and 15 of Figure 2 of the drawings. The arcuate plate 18a is loosely mounted upon the shaft 11a and carries the pivot pin 21a mounting the gear 22a and pinion 23a meshing with gears 15a and 14a, respectively, and correspond to the switch carrying plate 18a, pinion 21 and gears 22 and 23 of Figure 1. The armature 24a with the extension 25a provided with a latch 26a adapted to engage the teeth of the loosely mounted gear 14a corresponds with the operating arm 24, extension 25 and latch 26 of Figures 2 to 5, inclusive. In this instance, the electro-magnet 2a corresponds with the field 2 of the synchronous motor shown in Figure 2. The arms 49a and 56a are loosely mounted upon the shaft 11a in frictional engagement with the plate 18a in the same manner as the arms 49 and 56 in Figures 2, 3 and 4. In the modified form, the stop 48a corresponding to the stop 49a of Figures 2 and 3 is mounted on a plate 72 which plate is fixed to one end of the shaft 73, which shaft passes through to the rear of the clock mechanism and is secured to the bracket 19a mounting the delay switch 20a. The stop 48a serves two purposes. It not only is in line with and adapted to be engaged by the arm 49a in the same manner as the arm 49 engages the stop 48 in Figures 3 and 4, but is also adapted to be engaged by the arcuate section 74 depending below the plate 18a and joined to the section of lesser radius by an incline surface 75, whereby as the plate 18a is rotated in a counter-clockwise direction, the stop 48a will be engaged by the incline surface 75 causing the plate 72 to impart a clockwise rotation to the shaft 73 and after so doing maintain the shaft in its rotated position as the section 74 continues the rotation, so that the delay switch 20a will be rotated to the closed position, as shown in Figure 8, and when the magnet 2a is deenergized to free the gear 14a, the weight of the depending portion 74 will cause the plate 18a to rotate in clockwise direction, and as the stop 48a travels over the incline surface 75, the weight of the delay switch 20a will cause it to rotate to the open position, and at the time cause the stop 48a to travel over the portion of the plate 18a of lesser diameter until the arm 49a rests upon the stop 48a, as shown in Figure 9.

The safety switch 40a is carried by a bracket secured to one end of the shaft 50a on the rear of the clock mechanism which shaft 50a passes through the front plate 64 of the clock mechanism and fixedly mounts the catch 51a. These parts correspond to the switch 40, pivot 50 and stud 51 of Figures 3 and 4. Above the catch 51a and to the right thereof, the latch 52a is pivotally mounted and provided with a shoulder adapted to engage the catch 51a, when the safety switch 40a is rotated to closed position, and hold the same closed and is also provided with a stop 55a adapted to be engaged by the arm 56a when rotating in clockwise direction to move the latch 52a to free the catch 51a and allow the weight of the mercury tube 40a to rotate the same to the open position as shown in Figure 9. The catch 51a corresponds to the stud 51. The shouldered latch 52a corresponds to the pivoted latch 52 and the stop 55a corresponds to the stop 55 of Figures 2 and 3.

Mounted upon the front plate 64 is a spring pressed reset shaft 59a normally held out of contact with the catch 51a, which is rotated to contact the end of said shaft 59a as the switch 40a is rotated to open position, as shown in Figure 9. To reset and close the switch 40a the shaft 59a is depressed, whereby the catch 51a is again brought into contact with the shouldered latch 52a. The shaft 62a mounted in a manner similar to 59a is normally held out of contact with the latch 52a and has one end adapted upon depression to engage and rotate the latch 52a to release the catch 51a to shut down all operation in the same manner as the manual reset and manual release studs 59 and 62.

In wiring diagram, Fig. 7, the stack safety is the type disclosed in the applicant's prior Patent No. 1,691,016 dated November 6, 1928, constructed in this case to close a circuit upon a decrease in temperature, while boiler control B, in this instance is in the hot line ahead of the control circuit as sometimes preferred, relay R¹ and stoker motor SM¹ are of the same construction as the boiler control B, relay R and motor SM in Figure 1. The day thermostat DT and the night thermostat NT are commercial devices similar to the room thermostat T in Figure 1, the day thermostat being so adjusted as to maintain a high temperature during the day and the night thermostat so adjusted as to maintain a lesser temperature during the night.

The commercial line C2 is connected through binding post 34a to one terminal of the line switch L', the other terminal of which is connected by the lead 44a through the stoker motor SM' and through the binding post 36a to the return commercial line C3. The clock motor CM is connected to the commercial circuit through the leads 37a and 48a from binding post 34b' and binding post 45a to the return commercial line C3. The safety switch 40a is connected to the commercial line C2 through binding post 34c by lead 37b and thence by lead 42a to binding post 43a which is connected to one end of the winding of the stationary coil 27a of the relay R', the other end of which is connected through binding post 36a to the return line C3. The stack safety SS' is connected to the commercial line after the current is passed through the switch 40a and binding post 43a by lead 46a to one terminal of the stack safety switch 47a and from the other terminal through the electro-magnet 2a to the binding post 45a in the return line C3. One end of the winding of the secondary coil 28a is connected in circuit through binding post 30a and lead 68a through the switch 68 to binding post 30b and from thence through the day thermostat DT and lead 68b to binding post 31a which in turn is connected to the other end of the secondary winding of the coil 28a. The night thermostat NT is connected to the secondary coil 28a from binding post 30a through leads 32a, 68b and binding post 31a. The delay switch 20a is connected in the secondary circuit by the leads 33a from binding post 30a and binding post 31a, respectively.

In this modification, the closing of either the day or night thermostat energizes the relay to close the stoker motor circuit through the line switch L'. In the event that the program clock has opened the circuit 68a through the switch 68, the circuit through the day thermostat is broken and the night thermostat controls the operation of the stoker as the demand for heat is made. The clock motor in this instance is continuously operating and actuates the switch 68 to open and closed position by the adjustable stops 65 and 66 at the hours indicated by their position on the dial.

While the stoker is operating to maintain a high fire the circuit through the stack safety switch 47a will be opened, so that as soon as either the night or day thermostat opens, the stack safety switch 47a closes and the circuit is completed through the electro-magnet 2a causing the latch 26a to engage the gear 14a and hold it against rotation. Whereupon the plate 18a will be rotated bringing the incline surface 75 and projection 74 thereof in contact with the shoulder 48a to close the delay switch 20a, whereupon the primary coil of the relay will be energized to operate the stoker motor until there is a rise in temperature in the stack to open the circuit through the stack safety switch 47a which cycle will be continuously repeated until the room thermostat again calls for heat in the same manner as described in the first form.

In this instance, if either of the room thermostats call for heat and the fire has become extinguished, the plate 18a will be rotated until the arm 56a engages the shoulder 55a upon the latch 52a and further rotation releases the catch 51a to drop the safety switch 40a to open the circuit to the stack control and primary of the relay which breaks the circuit through the relay switch L' to prevent further operation of the stoker until the safety switch has been reset by the manually operable shaft 59a. In the event that a shut down is desired, the depression of the shaft 62a will release the latch 55a from engagement with the catch 51a to allow the safety switch 40a to open.

While this second modification is illustrated in connection with a continuously operating clock motor as usually employed in an electric program clock and an electro-magnet 2a controlled by the stack safety switch to control the operation of the delay switch, it is to be understood that any other continuously operating device may be employed for the same purpose.

What I claim is:

1. In a furnace, an electrically controlled stoker, a control circuit therefor, a switch responsive to the conditions of the space to be heated in the control circuit, an independent delay switch in the control circuit, electrically controlled mechanism for alternately opening and closing the delay switch, and an additional thermal switch in circuit with the said delay switch control mechanism, said thermal switch continuously and automatically opening and closing upon small changes in furnace temperature, closing upon a slight decrease below any degree and opening upon a slight increase above any degree, whereby fuel is fed at irregular periods for irregular periods caused by the irregular operation of the delay switch resulting from the reduction in furnace temperature between the closing of the additional switch and the delayed closing of the delay switch.

2. In a furnace, an electrically controlled stoker, a control circuit therefor, an automatic room temperature actuated switch in the control circuit, an independent delay switch in the control circuit, electrically controlled mechanism for alternately opening and closing the delay switch, and an additional thermal switch in circuit with the said delay switch control mechanism, said thermal switch continuously and automatically opening and closing upon small changes in furnace temperature, closing upon a slight decrease below any degree and opening upon a slight increase above any degree, whereby fuel is fed at irregular periods for irregular periods caused by the irregular operation of the delay switch resulting from the reduction in furnace temperature between the closing of the additional switch and the delayed closing of the delay switch.

3. In a furnace, an electrically controlled stoker, a control circuit therefor, an automatic room temperature actuated switch in the control circuit, an independent delay switch in the control circuit, an electrically operated and controlled mechanism for alternately opening and closing the delay switch, and an additional thermal switch in circuit with the said delay switch control mechanism, said thermal switch continuously and automatically opening and closing upon small changes in furnace temperature, closing upon a slight decrease below any degree and opening upon a slight increase above any degree, whereby fuel is fed at irregular periods for irregular periods caused by the irregular operation of the delay switch resulting from the reduction in furnace temperature between the closing of the additional switch and the delayed closing of the delay switch.

4. In a furnace, a motor operated stoker, a motor switch in the motor circuit, a room thermostat for closing the motor switch when heat is desired, a delay switch independent of the thermostat for alternately opening and closing the motor switch, a motor operated mechanism for actuating the delay switch, a mechanism motor circuit in parallel with the stoker motor circuit, and an additional thermal switch in the mechanism motor circuit continuously and automatically opening and closing upon small changes in furnace temperature, closing upon a slight decrease below any degree and opening upon a slight increase above any degree, whereby fuel is fed at irregular periods for irregular periods caused by the irregular operation of the delay switch resulting from the reduction in furnace temperature between the closing of the additional switch and the delayed closing of the delay switch.

5. In a furnace, a motor operated stoker, a motor switch in the motor circuit, a transformer relay for operating the motor switch, a room thermostat in series with the secondary coil of the relay, an independent delay switch in series with the secondary coil of the relay, the primary coil of the relay connected in parallel with the stoker motor circuit, a mechanism motor for alternately opening and closing the delay switch in parallel with the primary coil of the relay, and a control switch in series with the mechanism motor circuit responsive to furnace conditions adapted upon a decrease in temperature to close the said circuit and upon an increase in temperature to open said circuit.

6. In a furnace, a motor operated stoker, a motor switch in the motor circuit, a transformer relay for operating the motor switch, a room thermostat in series with the secondary coil of the relay, and an independent delay switch in series with the secondary coil of the relay, the primary coil of the relay connected in parallel with the stoker motor circuit, a mechanism motor for alternately opening and closing the delay switch connected in parallel with the primary circuit of the relay, and a control switch in series with the mechanism motor circuit responsive to furnace conditions adapted upon a decrease in temperature to close the said circuit to alternately actuate the delay switch to open and close the stoker motor circuit and upon an increase in temperature to open said circuit to the mechanism motor.

7. An electrically operated and controlled stoker, a motor and motor circuit therefor, a control circuit therefor, an automatic switch responsive to room temperature in the control circuit, an independent delay switch in the control circuit, electrically controlled mechanism for alternately opening and closing the delay switch, a switch in circuit with the delay switch control mechanism responsive to furnace temperature changes to open upon an increase in temperature and to close upon a decrease in temperature, a safety switch, and means actuated by the delay switch operating mechanism to open the motor circuit upon the failure of the switch responsive to furnace temperature changes to open.

8. In a furnace, a motor operated stoker, a motor switch in the motor circuit, a transformer relay for operating the motor switch, a room thermostat in series with the secondary coil of the relay, an independent relay switch in series with the secondary coil of the relay, the primary coil of the relay connected in parallel with the stoker motor circuit, a mechanism motor for alternately opening and closing the delay switch in parallel with the primary coil of the relay, and a control switch in series with the mechanism motor circuit responsive to furnace conditions adapted upon a decrease in temperature to close the said circuit and upon an increase in temperature to open the said circuit, a safety switch in the primary circuit of the relay, and means actuated by the mechanism motor to release said safety switch to open said circuit upon the control switch failing to open.

9. A remote control for a motor, an electric control circuit therefor, a delay switch in the control circuit, electrically controlled mechanism for alternately opening and closing the delay switch, an automatic switch in circuit with the delay switch control mechanism adapted to continuously open and close said circuit, said mechanism including a mechanism motor, a shaft driven thereby, a delay switch carrying plate mounted to freely rotate thereon, means actuated by the operation of the mechanism motor to rotate the carrying plate about the shaft to close the delay switch and upon cessation of operation to free the plate to return said switch to its original open position, and an adjustable arm carried on said rotatable plate, a stop adapted to be engaged by said arm when the plate is freed, whereby it may be determined by the position of the arm the number of rotations of the mechanism motor shaft necessary to close the delay switch.

10. A remote control for a motor, an electric control circuit therefor, a delay switch in the control circuit, electrically controlled mechanism for alternately opening and closing the delay switch, an automatic switch in circuit with the delay switch control mechanism adapted to continuously open and close said circuit, said mechanism including a mechanism motor, a shaft driven thereby, a delay switch carrying plate mounted to freely rotate thereon, means actuated by the operation of the mechanism motor to rotate the carrying plate about the shaft to close the delay switch and upon cessation of operation to free the plate to return said switch to its original open position, a normally closed releasable safety switch, and an adjustable arm carried on the said rotatable plate adapted to engage the safety switch release, whereby it may be determined by the position of the arm the number of rotations of the mechanism motor shaft necessary to shut down the controlled motor.

11. A remote control for a motor, an electric control circuit therefor, a delay switch in the control circuit, electrically controlled mechanism for alternately opening and closing the delay switch, an automatic switch in circuit with the delay switch control mechanism adapted to continuously open and close said circuit, said mechanism including a mechanism motor, a shaft driven thereby, a delay switch carrying plate mounted to freely rotate thereon, means actuated by the operation of the mechanism motor to rotate the carrying plate about the shaft to close the delay switch and upon cessation of operation to free the plate to return said switch to its original open position, an adjustable arm carried on said rotatable plate, a stop adapted to be engaged by said arm when the plate is freed, whereby it may be determined by the position of the arm the number of rotations of the mechanism motor shaft necessary to close the delay switch, a normally closed releasable safety switch, and an additional adjustable arm carried on the said rotatable plate adapted to engage the safety switch release, whereby it may be determined by the position of the latter arm the number of rotations of the mechanism motor shaft necessary after the closing of the delay switch to shut down the controlled motor.

12. A remote control for a motor, an electric control circuit therefor, an automatic temperature actuated switch responsive to room temperature in the control circuit adjusted for a certain temperature, a program clock operated switch for opening and closing the circuit through said automatic switch, an additional automatic temperature actuated switch in the control circuit adjusted for a lesser degree of temperature than said first automatic switch, an independent delay switch in the control circuit, electrically controlled mechanism for alternately opening and closing the delay switch, a switch in circuit with the delay switch control mechanism continuously and automatically opening and closing upon small changes in furnace temperature, closing upon a slight decrease below any degree and opening upon a slight increase above any degree, whereby fuel is fed at irregular periods for irregular periods caused by the irregular operation of the delay switch resulting from the reduction in furnace temperature between the closing of the additional switch and the delayed closing of the delay switch.

13. In a furnace, a motor operated stoker, a motor switch in the motor circuit, a thermostat responsive to room temperature for closing the motor switch when heat of a certain degree is desired, a program clock operated switch for opening and closing said thermostat circuit, an additional thermostat for closing the motor switch when the first thermostat circuit is opened and when heat of a lesser degree is desired, a delay switch independent of the thermostat for alternately opening and closing the motor switch, a motor operated mechanism for actuating the delay switch, a mechanism motor circuit in parallel with the stoker motor circuit, and an additional thermal switch in the mechanism motor circuit continuously and automatically opening and closing upon small changes in furnace temperature, closing upon a slight decrease below any degree and opening upon a slight increase above any degree, whereby fuel is fed at irregular periods for irregular periods caused by the irregular operation of the delay switch resulting from the reduction in furnace temperature between the closing of the additional switch and the delayed closing of the delay switch.

14. In a furnace, a motor operated stoker, a motor switch in the motor circuit, a transformer relay for operating the motor switch, a room thermostat in series with the secondary coil of the relay to close said circuit when heat of a certain degree is desired, a program clock operated switch for opening and closing said room thermostat circuit, an additional room thermostat in series with the secondary coil of the relay to close said circuit when the first room thermostat circuit is broken through the clock operated switch and when heat of a lesser degree is desired, an independent relay switch in series with the secondary coil of the relay, the primary coil of the relay connected in parallel with the stoker motor circuit, a mechanism motor for alternately opening and closing the delay switch in parallel with the primary coil of the relay, and a control switch in series with the mechanism motor circuit responsive to furnace conditions adapted upon a decrease in temperature to close the said circuit and upon an increase in temperature to open said circuit.

15. In a furnace, a motor operated stoker, a motor switch in the motor circuit, a transformer relay for operating the motor switch, a room thermostat in series with the secondary coil of the relay to close said circuit when heat of a certain degree is desired, a program clock operated switch for opening and closing said room thermostat circuit, an additional room thermostat in series with the secondary circuit of the relay to close said circuit when the first room thermostat circuit is broken through the clock operated switch and when heat of a lesser degree is desired, an independent delay switch in series with the secondary coil of the relay, the primary coil of the relay connected in parallel with the stoker motor circuit, a mechanism motor for alternately opening and closing the delay switch in parallel with the primary coil of the relay, and a control switch in series with the mechanism motor circuit responsive to furnace conditions adapted upon a decrease in temperature to close the said circuit and upon an increase in temperature to open the said circuit, a safety switch in the primary circuit of the relay, and means actuated by the mechanism motor to release said safety switch to open said circuit upon the control switch failing to open.

16. In an electrically operated control mechanism, a motor therefor, means for connecting and disconnecting said motor to a source of electricity, a shaft, means for rotating said shaft actuated by said motor, a plate mounted to rotate freely upon said shaft, means on said plate to actuate a control element, a gear mounted to rotate freely upon said shaft, a gear keyed to said shaft, a gear meshing therewith mounted upon said plate and having a pinion fixed thereto meshing with said freely rotatable gear, a lock actuated when the motor is energized to engage and hold said freely mounted gear against rotation, whereby rotation of the shaft is imparted to said plate and upon deenergization of said motor the plate is freed to return to its original position.

17. In an electrically operated control mechanism, a motor therefor, a shaft, means for rotating said shaft actuated by a train of gears operated by said motor, a weighted plate mounted for free rotation upon said shaft, means on said plate to actuate a control element, a gear mounted to rotate freely upon said shaft, a gear keyed to said shaft and meshing with a gear mounted upon said plate and having a pinion fixed thereto meshing with said freely rotatable gear, a magnetically actuated lock adapted to engage and hold said freely mounted gear against rotation, whereby rotation of the shaft is imparted to said plate and upon deenergization of said lock the plate is freed to return to its original position.

18. In an electrically operated control mechanism, a motor therefor, a shaft, means for rotating said shaft actuated by a train of gears operated by said motor, a weighted plate mounted for free rotation upon said shaft, means on said plate to actuate a control element, a gear mounted to rotate freely upon said shaft, a gear keyed to said shaft and meshing with a gear mounted upon said plate and having a pinion fixed thereto meshing with said freely rotatable gear, a magnetically actuated lock adapted to engage and hold said freely mounted gear against rotation, whereby rotation of the shaft is imparted to said plate and upon deenergization of said lock the plate is freed to return to its original position, an adjustable arm carried on said rotatable plate, a stop adapted to be engaged by said arm when said plate is freed, whereby it may be determined by the position of the arm the number of rotations of the shaft necessary to cause the plate to actuate the control element.

19. In an electrically operated control mechanism, a motor therefor, a shaft, means for rotating said shaft actuated by a train of gears operated by said motor, a weighted plate mounted for free rotation upon said shaft, means on said plate to actuate a control element, a gear mounted to rotate freely upon said shaft, a gear keyed to said shaft and meshing with a gear mounted upon said plate and having a pinion fixed thereto meshing with said freely rotatable gear, a magnetically actuated lock adapted to engage and hold said freely mounted gear against rotation, whereby rotation of the shaft is imparted to said plate and upon deenergization of said lock the plate is freed to return to its original position, a normally closed releasable safety control element, an adjustable arm carried on the said rotatable plate adapted to engage and release said safety element, whereby it may be determined by the position of the arm the number of rotations of the shaft necessary to release said element.

20. In an electrically operated control mechanism, a motor therefor, a shaft, means for rotating said shaft actuated by a train of gears operated by said motor, a weighted plate mounted for free rotation upon said shaft, means on said plate to actuate a control element, a gear mounted to rotate freely upon said shaft, a gear keyed to said shaft and meshing with a gear mounted upon said plate and having a pinion fixed thereto meshing with said freely rotatable gear, a magnetically actuated lock adapted to engage and hold said freely mounted gear against rotation, whereby rotation of the shaft is imparted to said plate and upon deenergization of said lock the plate is freed to return to its original position, a normally closed releasable safety control element, an adjustable arm carried on the said rotatable plate adapted to engage and release said safety element, whereby it may be determined by the position of the arm the number of rotations of the shaft necessary to release said element, an additional arm carried on said rotatable plate, a stop adapted to be engaged by said arm when the plate is free whereby it may be determined by the position of the arm the number of rotations of the shaft necessary to cause the plate to actuate the control element.

21. The method of maintaining a fire in an electrically operated and controlled furnace stoker heating system consisting in causing the feeding of fuel at a uniform rate until the desired temperature of the space to be heated is obtained, and thereafter upon a decrease in temperature in the combustion space and a predetermined delay thereafter to feed fuel until a rise in temperature of the combustion space occurs.

22. The method of maintaining a fire in an electrically operated and controlled furnace stoker heating system consisting in causing the feeding of fuel at a uniform rate until the desired temperature of the space to be heated is obtained, and thereafter upon a decrease in temperature in the combustion space and a predetermined delay thereafter to feed fuel until the fuel feeding means has been operated for a predetermined period.

23. The method of maintaining a fire in an electrically operated and controlled furnace stoker heating system consisting in causing the feeding of fuel at a uniform rate until the desired temperature of the space to be heated is obtained, and thereafter upon a decrease in temperature in the combustion space and a predetermined delay thereafter to feed fuel until either a rise in temperature of the combustion space occurs or the fuel feeding means has been operated for a predetermined period.

24. The method of maintaining a fire in an electrically operated and controlled stoker heating system, including a combustion space and a space to be heated, consisting in causing the feeding of fuel following a predetermined delay after a decrease in temperature in the combustion space until a rise in temperature therein occurs, and independently feeding fuel continuously whenever the temperature in the space to be heated falls below a predetermined degree until a predetermined rise occurs, and upon failure to increase the temperature in the combustion space, following the introduction of additional fuel within a predetermined period and thereafter to maintain the temperature in the combustion space during the continued feeding of fuel, to stop the fuel feeding means after a predetermined period has elapsed.

25. The method of maintaining the fire in an electrically operated and controlled stoker heating system, including a combustion space and a space to be heated, consisting in causing the feeding of fuel following a predetermined delay after a decrease in temperature in the combustion space until a rise in temperature therein occurs, and independently feeding fuel continuously whenever the temperature in the space to be heated falls below a predetermined degree until a predetermined rise occurs, and upon failure to increase the temperature of the combustion space, following the operation of the fuel feeding means for a predetermined period and thereafter maintain the temperature in the combustion space during the continuous operation of the fuel feeding means, to stop the fuel feeding means after a predetermined time has elapsed.

26. A thermo periodic control for coal stokers having in combination a time controlled switching mechanism, a thermostat for rendering said switching mechanism operative, and means for rendering said thermostat effective only while the temperature is decreasing along any portion of its entire temperature range.

27. In a furnace, an electrically controlled stoker, a control circuit therefor, a thermostat in the control circuit responsive to changes in temperature of the space to be heated, an independent refueling switch in the control circuit, a combustion thermostat responsive to conditions within the furnace, electrically controlled mechanism controlled by the combustion thermostat for closing the refueling switch a predetermined time after a decrease below any degree of temperature within the furnace, including means rendered operative during periods the combustion thermostat is responding to rising combustion temperatures to open and suspend reclosing of the refueling switch.

28. The structure of claim 27 including additional means to render the stoker inoperative, actuated by the electrically controlled mechanism in the event of a failure to increase the combustion temperature during a limited period of stoker operation, and means for manually resetting said additional means to restart stoker operation.

29. The method of controlling the feeding of fuel in an electrically operated and controlled furnace stoker heating system consisting in causing the feeding of fuel until the desired temperature of the space to be heated is obtained, and thereafter upon a decrease in temperature in the combustion space and a predetermined delay thereafter to feed fuel until a rise in temperature of the combustion space occurs, or in the absence of a rise in temperature of the combustion space after a period of feeding operation to stop the fuel-feeding means until manually re-started.

IRA E. McCABE.